United States Patent
Barr

(10) Patent No.: US 7,219,861 B1
(45) Date of Patent: May 22, 2007

(54) GUIDANCE SYSTEM FOR RADIO-CONTROLLED AIRCRAFT

(75) Inventor: Howard Barr, Encinitas, CA (US)

(73) Assignee: Spirit International, Inc., Carrollton, TX (US)

( * ) Notice: Subject to any disclaimer, the term of this patent is extended or adjusted under 35 U.S.C. 154(b) by 774 days.

(21) Appl. No.: 09/611,177

(22) Filed: Jul. 6, 2000

(51) Int. Cl.
*B64C 13/18* (2006.01)

(52) U.S. Cl. ...................................... 244/190
(58) Field of Classification Search ................ 244/189, 244/190, 17.13; 701/2
See application file for complete search history.

(56) References Cited

U.S. PATENT DOCUMENTS

| | | | |
|---|---|---|---|
| 3,141,634 A | * | 7/1964 | Rhoads et al. |
| 3,154,266 A | * | 10/1964 | Sheppard et al. |
| 4,038,590 A | | 7/1977 | Knowlton |
| 4,206,411 A | | 6/1980 | Meyer |
| 4,522,072 A | | 6/1985 | Sulouff et al. |
| 4,725,956 A | * | 2/1988 | Jenkins |
| 4,821,572 A | | 4/1989 | Hulsing, II |
| 4,964,598 A | | 10/1990 | Berejik et al. |
| 5,058,824 A | | 10/1991 | Cycon et al. |
| 5,067,674 A | | 11/1991 | Heyche et al. |
| 5,195,920 A | | 3/1993 | Collier |
| 5,249,272 A | | 9/1993 | Stern |
| 5,329,213 A | | 7/1994 | Orton et al. |
| 5,407,149 A | | 4/1995 | Singhai |
| 5,425,750 A | | 6/1995 | Moberg |
| H1469 H | | 8/1995 | Simonoff |
| 5,452,901 A | | 9/1995 | Nakada et al. |
| 5,507,455 A | | 4/1996 | Yang |
| 5,577,154 A | | 11/1996 | Orton |
| 5,672,086 A | | 9/1997 | Dixon |
| 5,730,394 A | * | 3/1998 | Cotton et al. |
| 5,785,281 A | | 7/1998 | Peter et al. |
| 5,789,677 A | | 8/1998 | McEachern |
| 5,904,724 A | * | 5/1999 | Margolin |

FOREIGN PATENT DOCUMENTS

| | | |
|---|---|---|
| DE | 196 14 987 A1 | 4/1996 |
| JP | 2000-5451 | 11/2000 |
| WO | WO 94/08847 | 4/1994 |

* cited by examiner

*Primary Examiner*—Tien Dinh
(74) *Attorney, Agent, or Firm*—Knobbe Martens Olson & Bear LLP

(57) ABSTRACT

A method and system are described for controlling the flight pattern of a remote controlled aircraft. The system includes a microcontroller that is linked to an accelerometer for determining the attitude of the aircraft and modifying signals to the aircraft's flight control system in order to prevent a crash. In addition, several preset flight patterns are stored in a memory so that upon activation, the aircraft will enter a preset flight pattern.

23 Claims, 6 Drawing Sheets

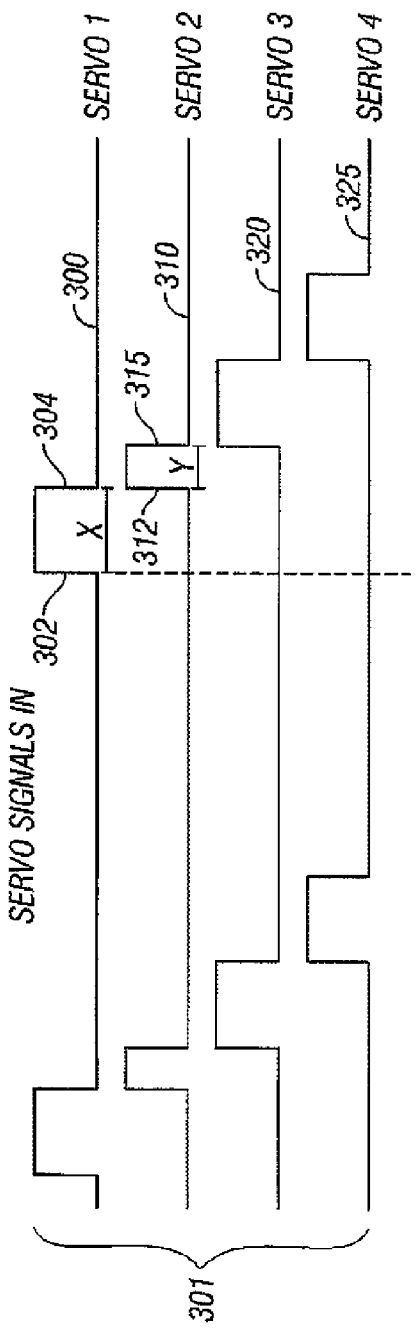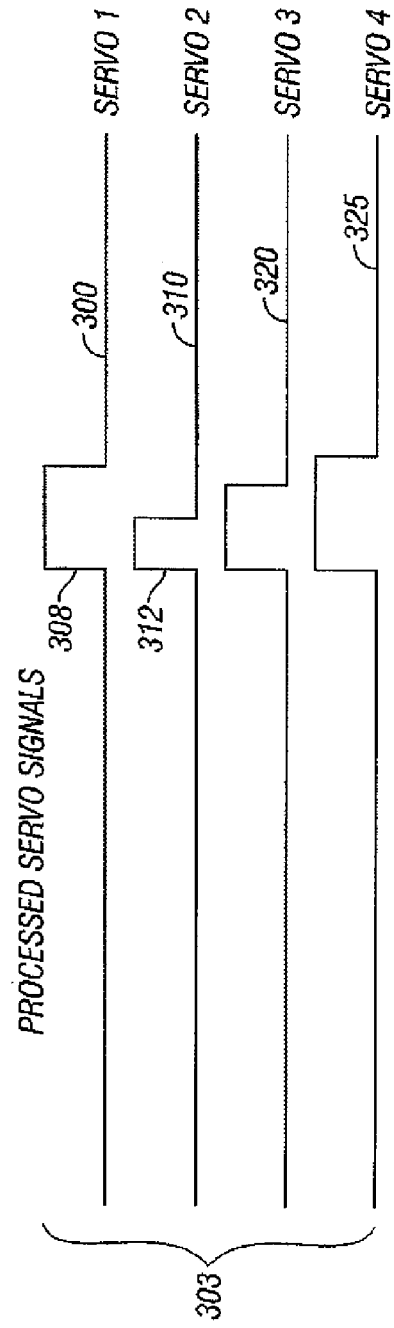

GUIDANCE SYSTEM FOR RADIO-CONTROLLED AIRCRAFT

BACKGROUND OF THE INVENTION

1. Field of the Invention

This invention relates to control systems for radio-controlled aircraft. More specifically, this invention relates to methods and systems for modifying the flight path of a radio-controlled aircraft.

2. Description of the Related Art

The sport of flying radio-controlled aircraft has increased in popularity over the past several years. Many hobbyists spend a tremendous amount of time building and flying these radio-controlled aircraft. As is known, these aircraft are flown by a pilot that sends control signals from a transmitter to a receiver in the aircraft.

A remote controlled airplane changes direction by movement around one or more of its three axes of rotation: lateral axis, vertical axis, and longitudinal axis. These axes are imaginary lines that run perpendicularly to each other through the exact weight center of the airplane. The airplane's rotation around them is termed pitch, roll, and yaw. The pilot guides the airplane by sending control signals to servos within the airplane that change the pitch, roll, and yaw by moving the elevators, ailerons, and rudder of the airplane.

Conventional remote controlled aircraft use radio frequency signals that are sent from the pilot's transmitter to a receiver in the airplane, which in turn generate a sequence of frequency modulated signals. Each control surface in the airplane is moved by a servo that receives these frequency modulated signals. By, for example, increasing the frequency of the signal that controls the elevator servo, the pilot can cause the airplane to ascend or descend. In the same manner, changing the pulse-width of the signals to the aileron servo will cause the airplane to turn.

Unfortunately, the chance that a beginner will successfully complete their first flight can be less than 1 in 10. This fact not only deters potential hobbyists from joining the sport, but also adds to the cost of taking up this sport since so many aircraft are destroyed during the learning stages.

One reason that so many aircraft are destroyed during the learning stage of flying remote-controlled aircraft is that no inexpensive and convenient system exists for assisting a novice pilot to maneuver the plane or recover from unstable flight situations. Some systems do exist for pilotless military aircraft, such as one described in U.S. Pat. No. 4,964,598 ('598) to Berejik et al. The system described in the '598 patent relies on feedback signals from gyroscopes in the airplane to control the bank-angle and actual rate of climb of the aircraft. While such a system might be appropriate for military drones, such a system is complex and would not provide a cost effective solution for radio-controlled airplane hobbyists.

What is needed in the art is a simple and inexpensive system that can be incorporated into radio-controlled aircraft systems in order to give novice pilots the ability to fly radio controlled aircraft without risking a crash. The present invention fulfills such a need.

SUMMARY OF THE INVENTION

One embodiment of the invention is a control system for remote-controlled aircraft. This embodiment includes: a receiver for receiving control signals from a transmitter; a control module in communication with said receiver and at least one aircraft flight control system, wherein said control module comprises instructions that, when executed, send modified control signals to said flight control system; and a positioning module in communication with said control module, said positioning module providing positioning signals representing the current attitude of the aircraft to said control module.

Another embodiment of the invention is a system for preventing crashes of a remote controlled aircraft that includes: a positioning module that determines the attitude of said remote controlled aircraft during flight; a control module in communication with said positioning module and with control signals received from a transmitter; and said control module comprising instructions for determining when said aircraft is at risk of crashing and, responsive to said determination, providing modified control signals to at least one aircraft flight control system, wherein said modified control signals reduce said risk of crashing said aircraft.

Yet another embodiment of the invention is a method of modifying the flight pattern of a remote controlled aircraft. The method includes: reading control signals from a transmitter; reading positioning signals corresponding to the attitude of said aircraft from a positioning module; determining if said control signals will place the airplane outside of defined performance parameters; and modifying said control signals so that performance of said airplane is within said defined performance parameters.

BRIEF DESCRIPTION OF THE DRAWINGS

FIG. 3 is a timing diagram illustrating processed servo signals within one embodiment of the circuitry of FIG. 2.

DETAILED DESCRIPTION

1. Overview

Figure 1:
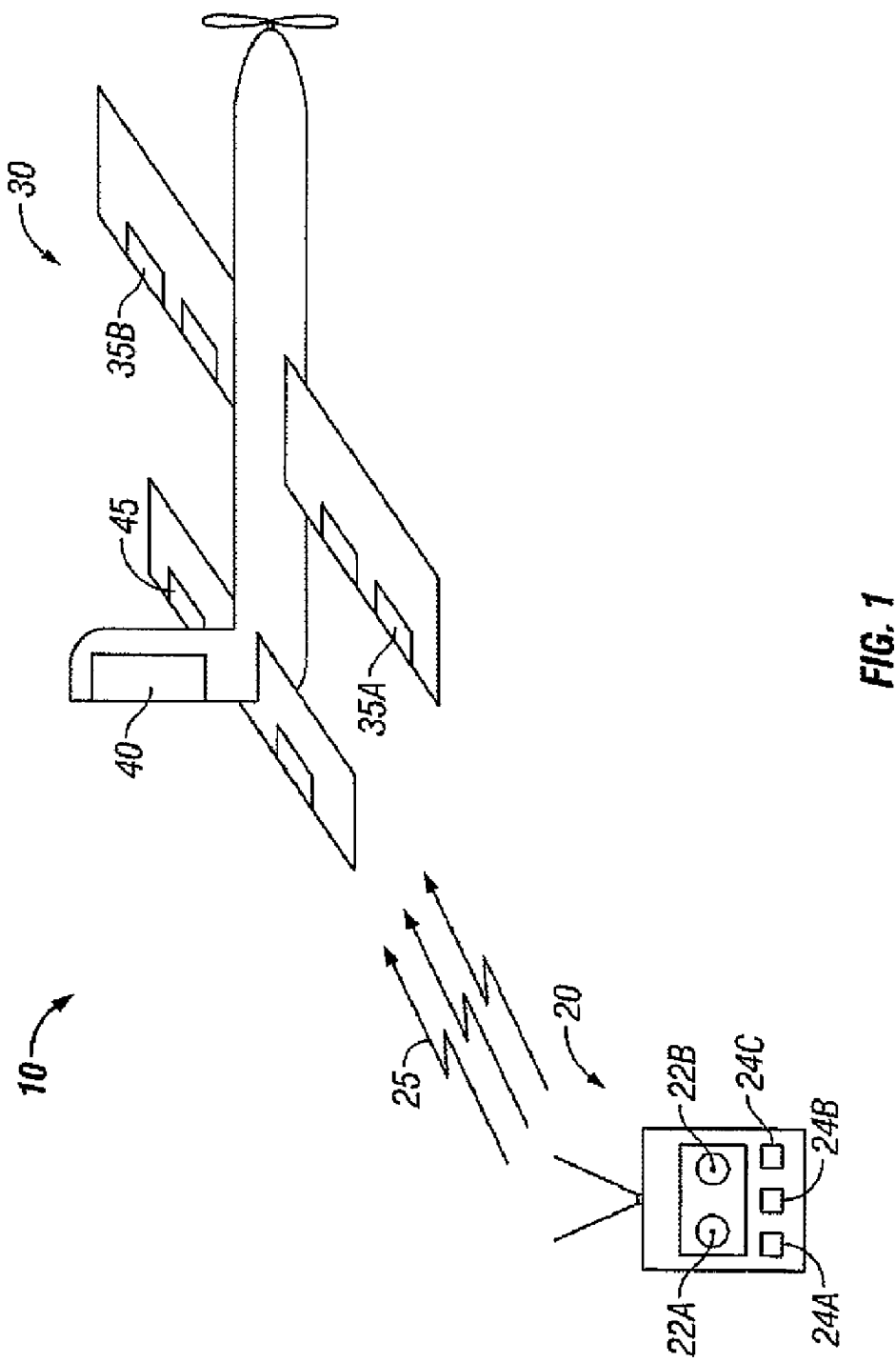
FIG. 1 is a schematic diagram of a remote-controlled aircraft.

Embodiments of the present invention relate to a low-cost, electronic guidance system that is incorporated into a remote controlled airplane and is capable of modifying the flight control signals sent by the pilot to the airplane. This embodiment functions by modifying the control signals that are sent by the pilot to the airplane. For example, if the pilot moves a control lever on the transmitter, the frequency of the signals being sent to a receiver in the aircraft are altered. The receiver in the aircraft then outputs pulse-width modulated signals to a microcontroller which analyzes the signals and outputs and, after making any necessary modifications, outputs the pulse-width modulated signals to the servos that control flight. Each movement of the control stick by the pilot causes signals at one or more frequencies to be transmitted to a receiver in the aircraft. These signals are converted to pulse-width modulated signals for controlling different servos or settings of the aircraft.

Each command transmitted by the pilot to the aircraft affects the position of either a servo, or other flight control system on the aircraft. In one embodiment, if the pilot changes the flight path by modifying, for example, the elevator servo, a microcontroller analyzes the request, along with data from an accelerometer or other level sensing device such as an inclinometer, to determine whether the maneuver might lead to an unstable flight. If the maneuver is one that might lead to an unstable flight, this system can modify the pulse-width of the signal from the receiver before being transmitted to the flight control servos, so that the airplane does not go out of control.

In use, the circuitry described below detects the intended position of each flight control system (aileron, engine, flaps, etc.) within the aircraft, and then modifies that position based on the current pitch and roll of the aircraft. The flight control systems include the mechanisms for powering and steering the aircraft, such as the servos, engine, ailerons, rudder and elevators.

In one embodiment, a plurality of accelerometers, here used as inclinometers, are located within the aircraft and provide sensed information to a microcontroller concerning the current attitude of the aircraft. Instructions stored within the microcontroller read the intended position of each servo from the frequencies transmitted by the ground transmitter and thereafter modify the pulse-width of the signals to prevent the plane from crashing, or to enter a pre-planned flight pattern, if signaled to do so by the pilot.

In addition to the above-referenced embodiment, other embodiments of the system are available. For example, an emergency flight mode is provided which allows the pilot to press an "emergency" button on the radio transmitter that sends a signal to the flight control circuitry instructing it to place the airplane in upright, level flight. The flight control circuitry determines the current position of the aircraft through the accelerometers, and calculates the proper servo positions of the elevators, ailerons and rudder to place the aircraft in level flight. Thus, the emergency button will right the aircraft from any position and place it in level flight.

Another embodiment of the invention includes a button that sends a command to the flight control circuitry to execute a constant flight path based on the current pitch and roll condition. By depressing this button, or otherwise executing a command to the flight control circuitry on the aircraft, the current pitch and roll condition is detected and stored to a memory. The microcontroller within the system then continually monitors the pitch and roll of the aircraft and makes any necessary adjustment in the servos to maintain the current attitude of the airplane.

Another embodiment of the system includes a "preset" flight mode. Upon activation by the pilot, the plane will execute a pre-programmed flight path based upon the current pitch and roll information. For example, the pre-programmed flight path might be a wide-sweeping circle. Thus, should the hobbyist get in trouble during a flight, this button on the transmitter can be activated to instruct the plane to correct itself from any current position. The plane will then enter a slow, circular loop until deactivated by the pilot. Once the "preset" flight mode has been entered, the plane will continue with the preset flight pattern until instructed to discontinue the pattern by receipt of a signal from the ground transmitter.

The preset flight mode might include specific patterns, such as a figure of "8", loop or spin. Thus, the pilot could enter aerobatic or complicated flight movements into a memory in the flight control system so that these movements could be repeated over and over without risk of error.

Another embodiment of the invention includes an ultrasonic ranging system that is integrated into the airplane electronics. In this embodiment, the ultrasonic sensor detects objects, such as walls, and can turn to avoid them. Thus, an airplane that could fly indoors by turning when a wall as detected is anticipated. In one embodiment, the aircraft includes a series of transducers and drive electronics for determining the distance of the aircraft from other objects. For example, the Polaroid Ultrasonics (Newton, Mass.) Model 6500 Series sonar ranging module can be integrated into the aircraft flight control system to report distances from other objects. Using this module, the distance from an object can be calculated based on the time of a transmit signal and the leading edge of the returning echo signal. The distance is then calculated as the transit time/speed of sound. The onboard central processor in the aircraft would then make an evaluation of what, if any, evasive maneuver to take based on the distance to the object.

2. System

Referring to FIG. 1, a radio-controlled flight system 10 is illustrated. The system includes a remote transmitter 20 that provides joysticks 22A,B and buttons 24A–C for sending frequency or amplitude modulated signals 25 to a remote-controlled aircraft 30. The aircraft 30 receives the signals 25 via a receiver (not shown). The received signals are fed through the flight control circuitry, as described below in FIG. 2, in order to control a set of ailerons 35A,B a rudder 40 and an elevator 45.

As can be imagined, adjusting the joysticks 22A,B or depressing the buttons 24A–C on the transmitter 20 sends signals 25 to the radio-controlled aircraft 30 that normally move the servos which control the ailerons, rudder and elevators.

Figure 2:
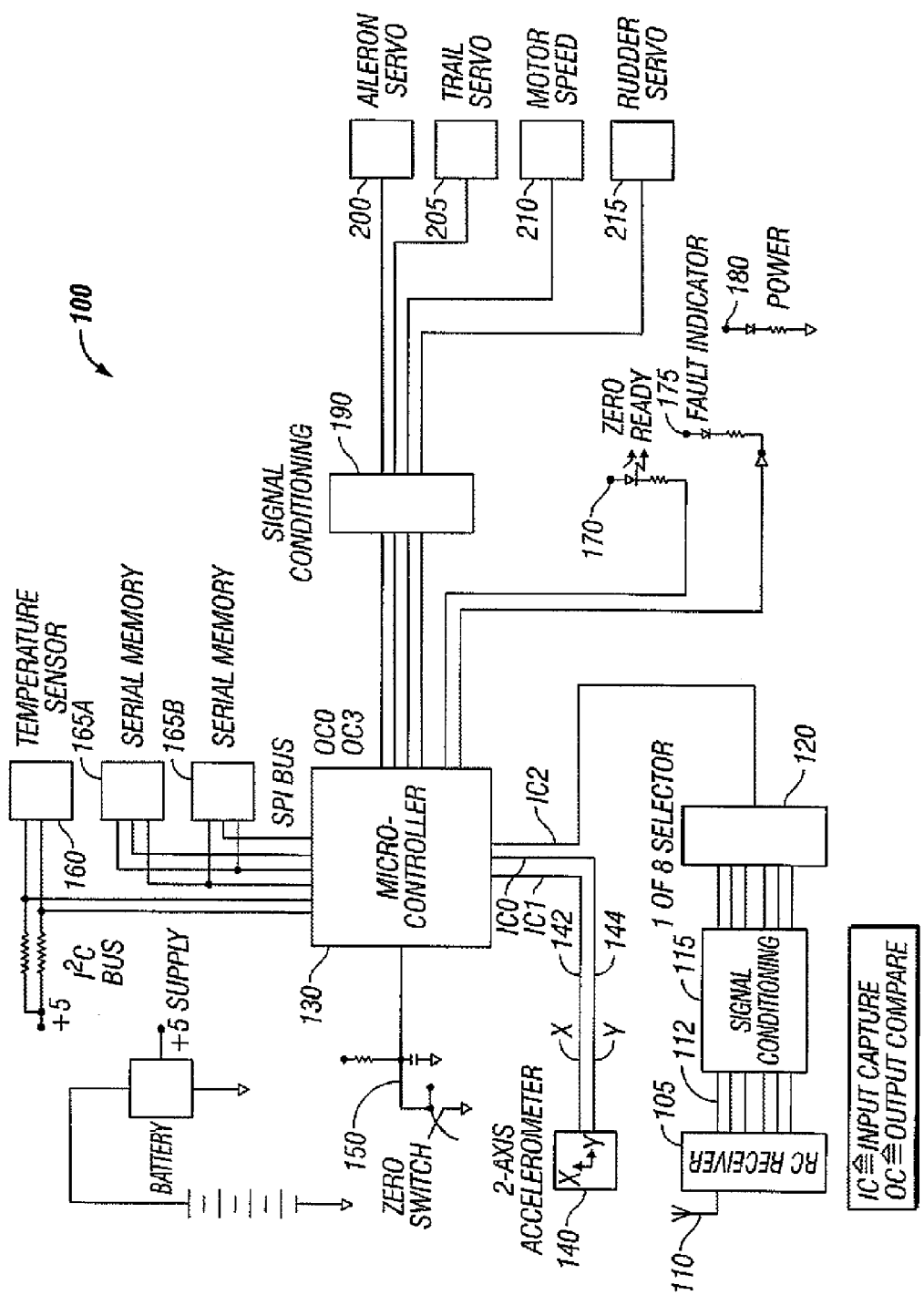
FIG. 2 is a block diagram illustrating one embodiment of the circuitry for controlling a remote-controlled aircraft.

FIG. 2 is a block diagram of a flight control system 100 that is mounted within the remote controlled airplane 30. As indicated, the flight control system 100 includes a radio-control receiver 105 that is linked to an antenna 110 for receiving frequency modulated signals in the frequency modulated system from the radio-control transmitter 20. The received servo signal commands are separated by the receiver 105 into servo signal paths 112 to a signal-conditioning circuit 115 that translates the servo signals into appropriate digital pulse-width modulated signals (typically 3V) by, for example, level shifting and transition sharpening the signal from the receiver. The signal conditioning circuit 115 preferably converts the incoming analog waveforms into sharp square waves having a 0–5V min-max. This prevents any pulse-width errors from entering the flight control system and affecting the airplane performance. In one embodiment, the signal conditioning circuit is a Texas Instruments (Dallas, Tex.) 74 HCT14 integrated circuit, followed by a 74 HC14.

The square wave pulse-width modulated signals are then sent to a one-of-eight selector circuit 120 that selects each conditioned frequency channel in a serial manner. As is shown, each frequency channel controls a separate servo, or other component such as the engine, within the airplane 30. Thus, a transmitter 20 might transmit frequency modulated signals along eight separate frequency channels for controlling the ailerons, propeller speed, elevator, rudder, etc. of the aircraft 30. The selector circuit 120 individually selects each servo channel so that the system 100 can analyze and modify one channel at a time prior to outputting it to a servo. The selector 120 chooses each channel on the leading edge of the square wave pulse, and thereafter waits for the trailing edge of the same channel before moving on to select the next channel in line to analyze. In this manner, the selector 120 serially transmits each channel being transmitted to the receiver 105. As each channel is selected from the selector 120, it is fed into a microcontroller 130 that processes all of the incoming signal data. In one embodiment, the microcontroller is a Motorola (Austin, Tex.) MC 68 HC711D3. This microcontroller includes four kilobytes of on-board Programmable Read Only Memory (PROM) for storing instructions, and 192 bytes of on-chip Random Access Memory (RAM).

Also feeding into the microcontroller 130 is a two-axis accelerometer 140 that provides pulse-width modulated signals 142, 144 corresponding to the present X and Y dimensional acceleration of the airplane 30, which corresponds to the airplane's pitch and roll. Several inclinometers could be used as accelerometers. For example, a Model LCL (The Fredricks Company, Huntingdon Valley, Pa.) or Biaxial Accelerometer Model LA02-0201-1 from Humphrey (San Diego, Calif.) are useful for embodiments of an accelerometer or an inclinometer. However, preferably the accelerometer is an Analog Devices (Norwood, Mass.) ADXL 202 Model accelerometer. The ADXL202 is a complete 2-axis accelerometer with a measurement range of ±2 g. The ADXL202 can measure both dynamic acceleration (e.g., vibration) and static acceleration (e.g., gravity). The outputs of the ADXL202 are Duty Cycle Modulated (DCM) signals whose duty cycles (ratio of pulse-width to period) are proportional to the acceleration in each of the 2 sensitive axes. These outputs may be measured directly with a microprocessor counter. The DCM period is adjustable from 0.5 ms to 10 ms via a single resistor ($R_{SET}$). If an analog output is desired, an analog output proportional to acceleration is available from the $X_{FILT}$ and $Y_{FILT}$ pins, or may be reconstructed by filtering the duty cycle outputs. Furthermore, filter capacitors external to these outputs are set to the appropriate bandwidth. This helps stabilize control of the airplane due to vibrations from the motor affecting the readings from the inclinometer.

Because of the design of this system, the microcontroller 130 thus receives input from the receiver 105 and the accelerometer 140. Within the PROM of the microcontroller 130 are instructions for receiving signals from the accelerometer 140 and selector 120 and determining the proper output signals to transmit to the servos. This process will be discussed more completely below in the following figures.

The microcontroller 130 also has inputs from a "Zero" switch 150 that is used to set the level flight angle for the aircraft 30 before take-off. By depressing the zero switch 150, the microcontroller 130 samples the current two-axis accelerometer position and determines the level flight position for the aircraft. This zero position can be used later during flight by the microcontroller 130 to determine the appropriate yaw and pitch for the aircraft when level flight is required.

The microcontroller 130 also communicates through a software-generated I²C bus with a temperature sensor 160 that provides temperature compensation for the accelerometer 140 and other sensing electronics. In one embodiment, the temperature sensor is a National Semiconductor (Santa Clara, Calif.) Model LM75 temperature sensor.

Also connected to the microcontroller 130 are a pair of serial memory circuits 165A,B that can store flight information during the flight or store pitch and yaw data for future maneuvers. As will be discussed with regard to FIG. 3, the microcontroller 130 buffers incoming pulse-width modulated signals from the transmitter in order to present the signals to the servos in a parallel manner, instead of serially. In one embodiment, the serial memory is an Atmel (San Jose, Calif.) Model AT25256, a 256K bit memory device.

Also connected to the microcontroller 130 is a ZERO READY indicator light 170, a FAULT indicator 175 and a POWER indicator light 180. In use, the ZERO READY indicator light flashes to indicate when the system is ready to be zeroed by the pilot. Pressing the zero switch 150 then sets the current state of the accelerometer to a memory in the microcontroller 130. The FAULT indicator light 175 is illuminated whenever a fault or error is detected within the flight control system 100. The POWER indicator light 180 is illuminated whenever power is applied to the flight control system 100.

The microcontroller 130 outputs signals to the servos along a group of output connections. The output connections first pass through a digital signal conditioning circuit 190, and then to an aileron servo 200, tail servo 205, motor speed output 210 and rudder servo 215.

Referring now to FIG. 3, a timing diagram is shown, illustrating an RF signal 301 received by the flight control system, and the same servo signals 303 once they have been processed by the flight control system and are sent to the servos. In particular, the timing signals for each servo are provided serially from the transmitter 20 to the receiver 105 in the airplane 30. For example, a signal 300 is transmitted along frequency channel 1 in order to manipulate servo 1 that controls the rudder. The signal 300 includes a leading edge 302 and trailing edge 304. The pulse-width of the signal is defined as X, and is used by the flight control system to calculate the angle of movement for servo 1 (rudder). The larger the pulse-width varies from nominal, the more that servo 1 moves from its zero angle.

As also indicated, a signal 310 corresponding to servo 2 (ailerons) is transmitted along frequency channel 2. Signal 310 includes a leading edge 312 and trailing edge 315. The pulse-width of the signal 310 is defined as Y. As shown, because the analog signals from the transmitter 20 are sent serially, the trailing edge 304 of signal 300 aligns with the rising edge 312 of signal 310. As illustrated, the rising and falling edges of the signals 320 and 325, corresponding to servos 3 and 4, respectively, also follow one another in a serial manner.

For this reason, and as illustrated in FIG. 3B, the outputs from the signal-conditioning device 190 (FIG. 2) process the incoming signals so that the signals sent to the server in embodiments of this invention are aligned in parallel. As illustrated, the leading edge 302 of the signal 300 aligns with the leading edge 312 of the signal 310. This is also true of the leading edges of the other signals 320 and 325. Thus, the servos that are controlled by these signals are moved simultaneously.

Figure 4:
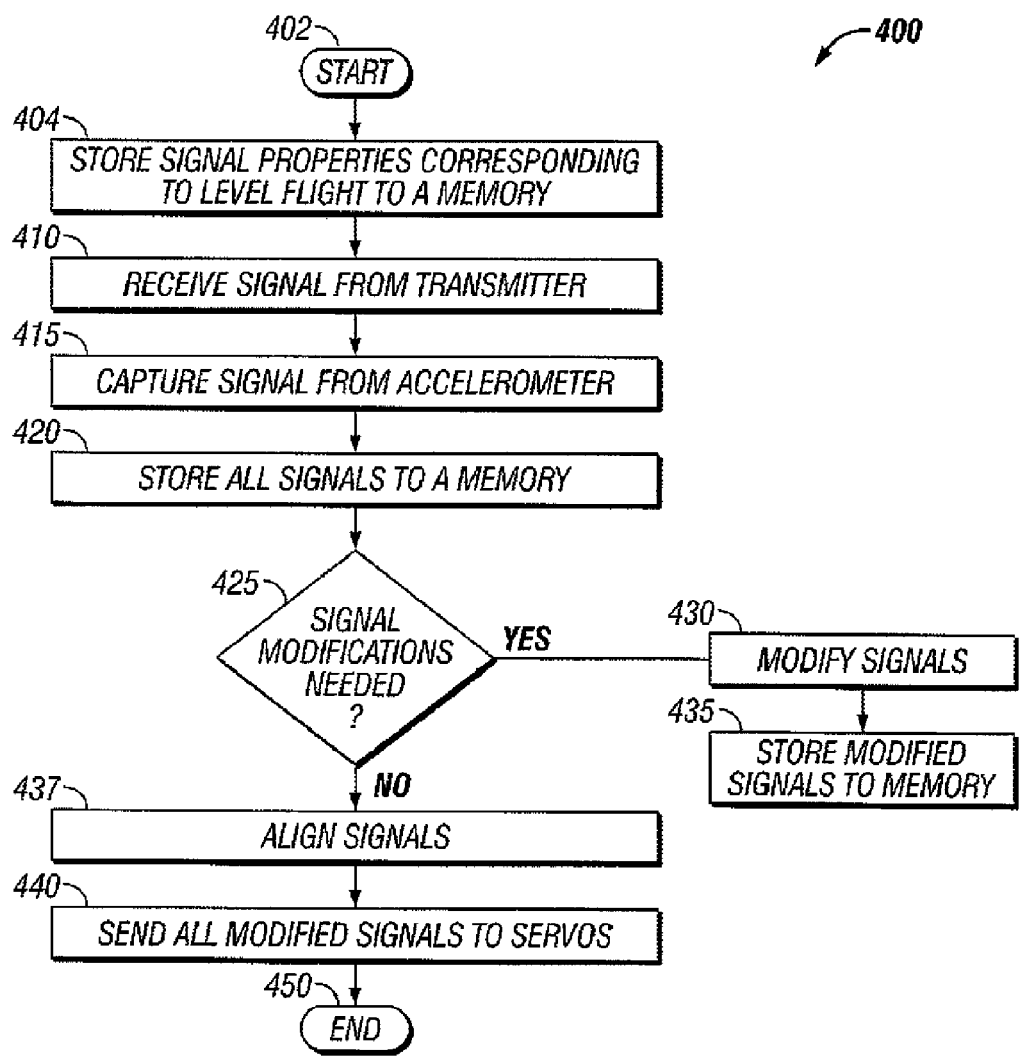
FIG. 4 is a flow diagram illustrating a process for sending modified signals to servos in a remote-controlled aircraft.

Referring now to FIG. 4, a process for receiving and sending signals to servos within the flight control system is illustrated. The process 400 begins at a start state 402 and then moves to a state 404 wherein signal properties corresponding to level flight for the aircraft are stored to the serial memory 165 within the flight control system 100. The process 404 is normally activated by pressing the zero switch 150 in order to indicate that the current settings for the aircraft correspond to level flight. The current settings from the accelerometer are then stored to a memory in the microcontroller. The aircraft is then launched from the ground and, at the state 410, signals are received from the transmitter 20. The process 400 then moves to a state 415 wherein the current yaw and pitch of the aircraft are captured by the microcontroller 130 from the accelerometer 140. Once the yaw and pitch have been captured by the microcontroller 130, and any signals corresponding to flight requests have been received from the transmitter 20, the process 400 moves to a state 420 wherein all of the signals can be stored to one of the serial memories 165A,B.

Once the signals have been stored to a memory at the state 420, the process 400 moves to a decision state 425 wherein a determination is made whether the signals coming from the transmitter 20 need to be modified before being sent to the servos. This decision process is normally undertaken by instructions within, or communicating with, the microcontroller 130. For example, software instructions and algorithms for analyzing the accelerometer signals and transmitter signals are preferably stored in the PROM of the microcontroller.

A determination to modify the pulse-width of the signals from the transmitter 20 is based on the requested servo positions from the transmitter 20, along with the data input from the accelerometer 140. For example, if the data coming from the transmitter indicates a sharp, diving right turn, the microprocessor may determine based on the yaw and pitch from the accelerometer that such a maneuver might lead to unstable flight or an aircraft crash.

If a determination is made at the decision state 425 that signal modifications are needed prior to transmitting the signals to the servos, the process 400 moves to a process state 430 wherein the signals are modified. The process of modifying signals is described more specifically in FIG. 5. Once the signals have been modified at the process state 430, the modified signals are stored to the serial memory 165A,B at a state 435. The process 400 then moves to a state 437 wherein the leading edges of all the signals are aligned. The process 400 then moves to a state 440 wherein all of the aligned signals are transmitted to the servos and any other aircraft flight control system. Thus, the modified, aligned signals are sent to the servos which thereafter modify the flight path of the aircraft. The process then ends at an end state 450.

Figure 5:
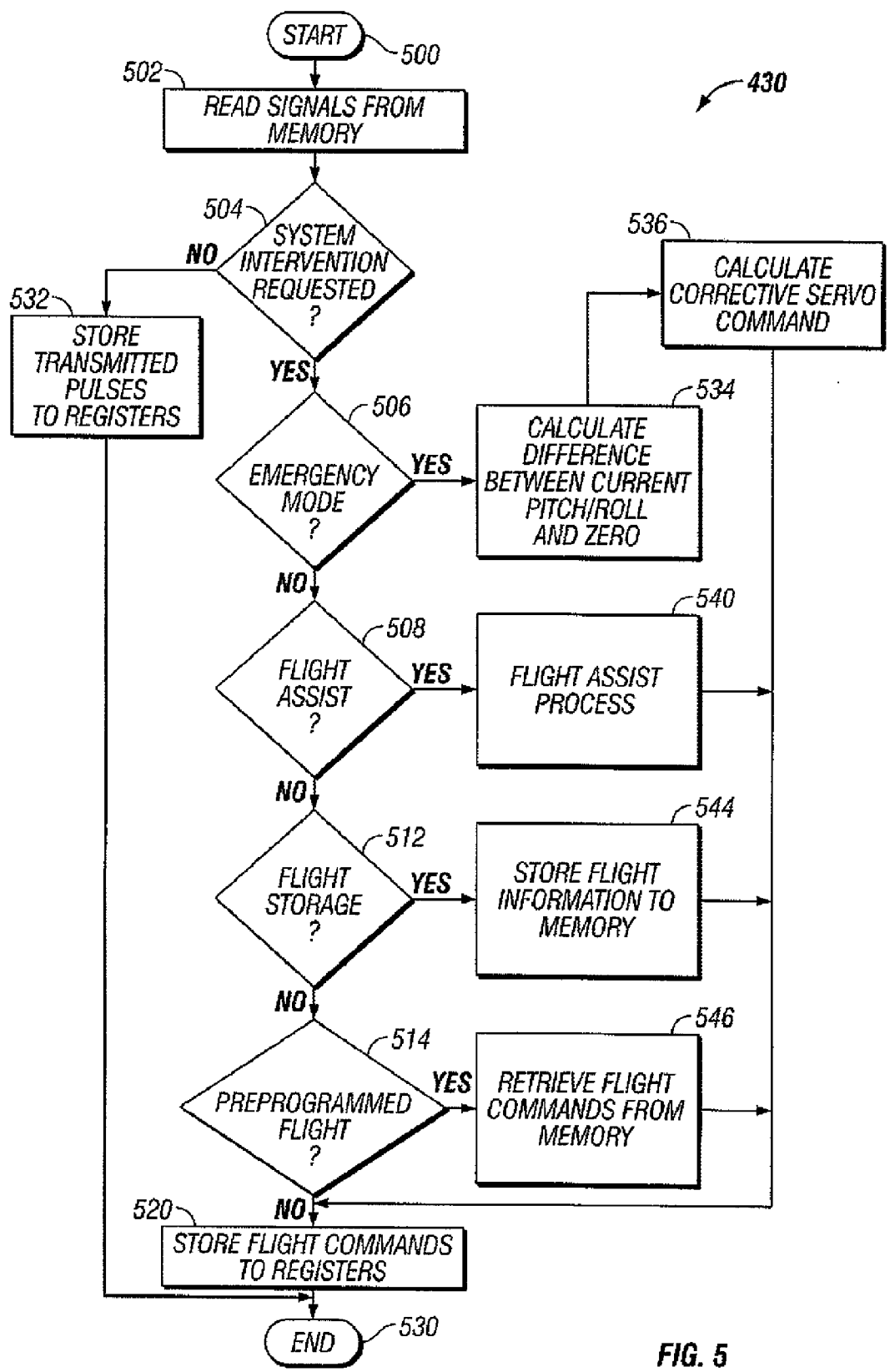
FIG. 5 is a flow diagram illustrating the modify signals process of FIG. 4.

Referring to FIG. 5, the process 430 of modifying signals prior to being sent to the aircraft's flight control systems is explained. The process 430 begins at a start state 500 and then moves to a state 502 wherein the signals are read from a memory storage. Once this information has been read, the process 430 moves to a decision state 504 wherein a determination is made whether any system intervention has been requested by the pilot. System intervention can be requested by, for example, pressing a button on the transmitter, or otherwise sending a signal to the receiver in the aircraft. In one embodiment, an extra servo channel can be used to signal the system by introducing preselected pulse widths. If system intervention has been requested, the process 430 moves to a decision state 506 in order to determine whether the type of intervention requested was an emergency mode. Such an emergency mode might be requested when the pilot can no longer control the aircraft. If a determination is made at the decision state 506 that an emergency mode has not been requested, the process 430 moves to a decision state 508 in order to determine whether a flight assist mode has been requested. As described above, a flight assist mode is used by the pilot in order to prevent the pilot from making mistakes during the flight. The flight assist mode allows the pilot to fly the plane freely, but prevents any actions such as a steep dive, roll, etc. that could lead to a crash.

If a determination is made that the flight assist mode has not been requested, the process 430 moves to a decision state 512 to determine whether a flight storage mode has been requested. A flight storage mode is requested when the pilot wishes to save the flight pattern of the aircraft to a memory in order to download it later to a computer for review. If a determination is made at the decision state 512 that the flight storage mode has not been requested, the process 430 moves to a decision state 514 to determine whether preprogrammed flight has been requested. Such preprogrammed flight might be, for example, when the pilot wishes to fly the plane in a preprogrammed configuration, such as a circle, ellipse or oval pattern. If a determination is made that preprogrammed flight has not been requested, the process 430 moves to a state 520 wherein the current flight commands for the aircraft are stored to registers within the flight control system 100. The process 430 then executes the stored flight commands by sending them to the appropriate servos at a state 522. The process then terminates at an end state 530.

If a determination had been made at the decision state 504 that no system intervention was requested, the process 430 moves to a state 532 wherein the signals transmitted by the pilot to the aircraft are stored to registers within the flight control system 100. The process 430 then moves to the state 522 to execute the servo commands.

If a determination had been made at the decision state 506 that an emergency mode was requested by the pilot, the process 430 moves to a state 534 wherein the difference between the current pitch and roll of the aircraft and a zero setting are calculated. As is known, the zero setting would correspond to straight and level flight parameters. The process 430 then moves to a state 536 wherein a corrective servo command is calculated in order to return the aircraft to a zero (level flight) position. The process 430 then moves to the state 520 to store those calculated flight commands to registers within the flight control system 100.

Figure 6:
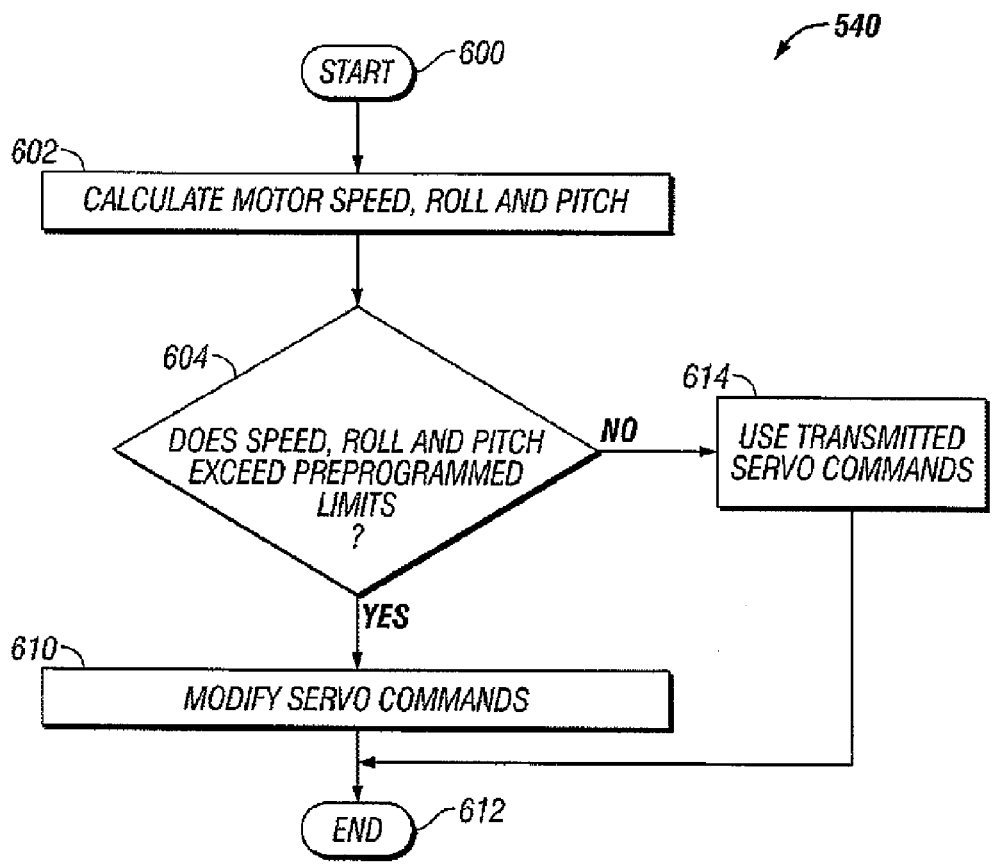
FIG. 6 is a flow diagram illustrating the flight assist process of FIG. 5.

If a determination was made at the decision state 508 that a flight assist mode had been requested, the process 430 moves to a flight assist process state 540, as described below in reference to FIG. 6. The process 430 then moves to the state 520 to store the flight assist commands to registers within the flight control system 100.

If a determination was made at the decision state 512 that the pilot had requested to store flight information, the process 430 moves to a state 544 wherein flight information is stored to a memory within the flight control system 100. It should be realized that storing flight information to a memory can be either a one-time event, such as storing the current position of the aircraft, or can be an on-going process of storing all the roll and pitch settings so that those commands can be later entered into a computer system in order to illustrate the flight path of the aircraft. Once the roll and pitch information has been stored to a memory at the state 544, the process 430 moves to the state 520 wherein the transmitted signals from the pilot are stored to registers and thereafter executed by the servos.

If a determination was made at the decision state 514 that the pilot had requested a preprogrammed flight pattern, the process 430 moves to a state 546 wherein a stored flight plan is retrieved from a memory within the flight control system. Such a stored flight path might include acrobatic flight commands or any other preprogrammed pattern to be flown by the aircraft. The process 430 then moves to a state 520 wherein the retrieved flight commands are stored to registers within the flight control system 100.

Referring now to FIG. 5, the flight assist process 540 is explained in more detail. The process 540 begins at a start state 600 and then moves to a state 602 wherein the aircraft motor speed, roll and pitch are calculated for the current state of the aircraft. The process 540 then moves to a decision state 604 to determine whether the speed, roll and pitch of the aircraft are exceeding preprogrammed limits that are stored within the flight control system for safe flight. The pre-programmed limits can be determined experimentally, or by setting maximum parameters for turning angles, speed and roll settings. For example, a turning angle of greater than 40°, 50°, 60°, 70°, 80° or 90° could be set as maximum. If a determination is made that the speed, roll and pitch do exceed preprogrammed limits, the process 540 moves to a state 610 wherein the servo commands are modified by the system prior to being sent to the servos. Thus, before the aircraft is put into a position that exceeds preprogrammed limits, the servo commands are modified in order to lessen the disadvantageous effects such a maneuver might have on the aircraft. For example, the servos might only be positioned so that the aircraft makes a gentle turn even though the pilot called for a very steep turn. Once the servo commands have been modified at the state 610, the process 540 terminates at an end state 612.

It should be realized that if the speed, roll and pitch did not exceed preprogrammed limits at the decision state 604, the transmitted servo commands from the pilot are used at a state 614 and thereafter stored to registers within the flight control system at the state 520 (FIG. 5).

3. Other Embodiments

Other embodiments of the invention include systems and methods that allow the aircraft to enter a variety of preset flight patterns. For example, in one embodiment, the microcontroller reads stored pulse width modulated signals from the serial memory. The microcontroller then outputs those signals to the aircraft control systems, such as servos and the engine, so that the aircraft is placed in a slow, level, circular pattern. The stored signals slow the propeller and angle the ailerons so that the aircraft begins a slow turn. Of course, it should be understood that any pattern of pulse-width modulated signals can be stored in the memory and retrieved upon activation by the pilot. These patterns can include figure eight, circular, oval and straight-line flight, for example.

Other embodiments include the use of a velocity sensor in addition to the accelerometer or inclinometer discussed above. The inclusion of a velocity sensor provides the ability to calculate and analyze the acceleration of the aircraft during flight. Once such velocity sensor is the orifice plate (as described, for example in *Fluid Mechanics*, by Frank White, McGraw Hill, 1979, pg. 380 ff. and *Flow Measurement and Control*, W. F. Coxon, The MacMillan Company, 1959, pg. 269–286).

Figure 7:
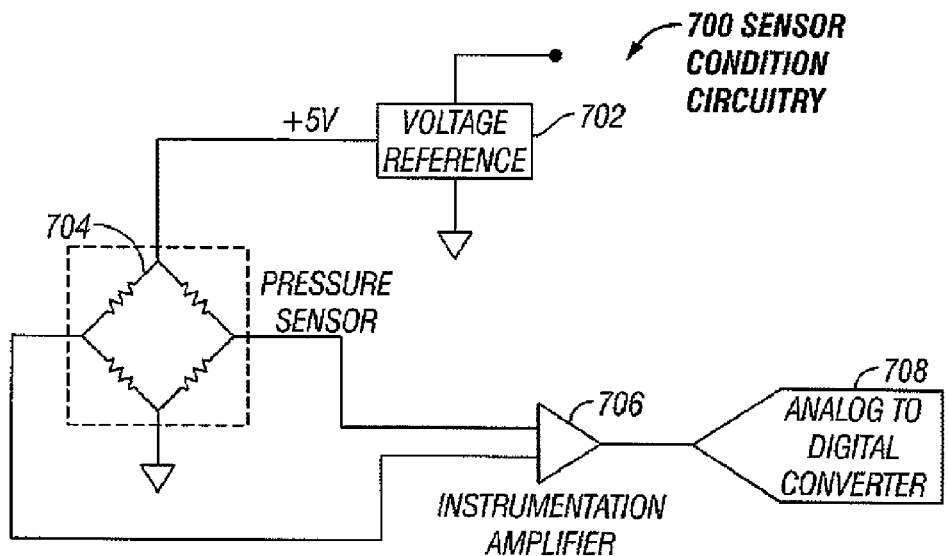
FIG. 7 is a block diagram illustrating an embodiment of a sensor conditioning circuit.

Referring to FIG. 7, the differential pressure during acceleration can be measured with a sensor conditioning circuit 700 having a pressure sensor 704, such as a Sentir (San Jose, Calif.) Model SMD, surface mounted pressure die, with an optional two port option (differential). The die sensitivity (80 uV/V/PSI–3000 uV/V/PSI) is selected to match the orifice plate that is designed to measure the plane's speed. In addition, the orifice-plate flow meter is designed using the equations in the references listed above. These equations determine a pressure differential based on the mechanical configuration of the particular orifice plate and the flow tube used at certain velocities. Thus, a particular flow tube and orifice plate can be selected by one of ordinary skill in the art with acceptable measure pressure differentials which are generated at particular velocities of the aircraft. This acceptable pressure differential is preferably in the sensitivity range of the pressure sensor's sensitivity, in units of μvolts/applied voltage/applied pressure, when excited and amplified. These calculations determine a pressure differential for a given mechanical configuration, which in turn places a requirement on the sensitivity of the sensor to achieve high quality signals.

One embodiment of the sensor conditioning circuit 700 is shown in FIG. 7. Typically, the piezoresistive sensor 704 is driven via a current source or voltage source of 5 Volts using a voltage reference 702, such as the Analog Devices (Norwood, Mass.) REF195. An instrumentation amplifier 706, such as the Analog Devices AD620 can be used to amplify the signal, which in turn is converted to a digital signal via an Analog to Digital (A/D) converter 708, such as the Linear Technology (Milpitias, Calif.) LT1598 (an 8-Channel version). The A/D converter 708 can be driven by the Serial Peripheral Interface (SPI) on the MC68711D3 microcontroller 130 within the aircraft. Note that any corrections required to correct the voltage vs. velocity calculation can be determined since the sensor can be zeroed before every flight (along with the accelerometers). Moreover, compensation for the environmental temperatures are monitored by the temperature sensor 160.

Similarly, an altimeter can be added to the system by using the similar electronics with, in this case, an absolute pressure sensor. These sensors are extremely sensitive parts (>3000 uV/V/PSI), with one side at vacuum and the other side reading atmospheric pressure. Again, initial offsets or corrections due to temperature can be made using the temperature sensor 160, once processed by the microcontroller 130. The mechanism for signal processing is similar to above as outlined in the Sensor Conditioning Circuitry 700.

In addition, it should be realized that the signals being interpreted by the microprocessor can be averaged prior to being output to the servos. This averaging can provide for a smoother transition from one flight position to another.

What is claimed is:

1. A method of modifying a flight pattern of a remote controlled aircraft onboard said aircraft, comprising:
   reading control signals from a transmitter;
   reading positioning signals corresponding to a current attitude of said aircraft from two-axis accelerometer that measures a directional component of the acceleration of gravity to determine the current attitude of the aircraft, wherein said positioning signals further comprise pulse width modulated signals;
   determining, based on said current attitude, if said control signals will place said aircraft in a flight or pattern outside of a set of defined performance parameters; and
   modifying said control signals so that said flight pattern is within said set of defined performance parameters.

2. The method of claim 1, wherein modifying said control signals comprises modifying said control signals so that said aircraft begins a straight and level flight.

3. The method of claim 1, wherein modifying said control signals comprises modifying said control signals so that said airplane does not turn with an angle of greater than a preset number of degrees.

4. The method of claim 3, wherein said preset number of degrees is selected from the group consisting of 20, 30, 40, 50, 60, 70, 80 and 90 degrees.

5. The method of claim 3, wherein said positioning signals are generated by an accelerometer that comprises an inclinometer.

6. The method of claim 3, wherein said control signals comprise pulse-width modified signals.

7. A control system in a remote-controlled aircraft, comprising:
   a receiver for receiving control signals from a transmitter;
   a positioning module comprising an accelerometer that provides positioning signals representing the attitude of said remote control aircraft determined from a directional component of gravitational acceleration; and a control module that receives said control signals and said positioning signals, and is adapted to determine, based on the attitude, if said control signals will place said aircraft in a flight pattern outside of a set of predetermined performance parameters, and output modified control signals to at least one flight control system of said remote-controlled aircraft based on both said received control signals and said received positioning signals so that said flight pattern is within said set of predetermined performance parameters.

8. The control system of claim 7, wherein said control signals and said modified control signals are pulse-width modulated signals.

9. The control system of claim 7, wherein said control module comprises a microcontroller or a microprocessor.

10. The control system of claim 7, wherein said aircraft flight control system is selected from the group consisting of: a servo, an engine, a rudder, an aileron and an elevator.

11. The control system of claim 7, wherein said positioning module comprises an accelerometer comprising an inclinometer.

12. The control system of claim 7, wherein said control module is further adapted to provide modified guidance signals to said flight control system that place said aircraft in straight and level flight.

13. The control system of claim 7, wherein said control module is further adapted to provide modified guidance signals to said at least one flight control system that result in said aircraft entering a predetermined flight pattern.

14. The control system of claim 7, wherein said modified control signals comprise pulse-width modulated signals that are aligned along a leading edge of said modulated signals.

15. The control system of claim 7, wherein said control module comprises instructions that are stored in a memory.

16. The control system of claim 15, wherein said memory is selected from the group consisting of a Random Access Memory (RAM), a Read Only Memory (ROM), an Erasable Programmable Read Only Memory (EPROM) and an Electrically Erasable Programmable Read Only Memory (EEPROM).

17. A system for preventing crashes of a remote controlled aircraft, comprising:

a receiver for receiving control signals from a transmitter;

a positioning module comprising an accelerometer that measures a directional component of the gravitational force to provide positioning signals representing an attitude of the remote controlled aircraft; and a control module adapted to read said control signals and said positioning signals to output modified control signals to at least one flight control system of said remote controlled aircraft in order to reduce a risk of crashing said aircraft.

18. A system in a remotely controlled aircraft for preventing crashes, comprising:

a receiver for receiving control signals from a transmitter;

a positioning module that provides positioning signals representing an attitude of the remote controlled aircraft by measuring a component of a static acceleration; and a control module adapted to read said control signals and said positioning signals and further adapted to output modified control signals to at least one flight control system of said remote controlled aircraft in order to reduce a risk of crashing said aircraft.

19. The system of claim 17, wherein said control module comprises a microcontroller or a microprocessor.

20. The system of claim 17, wherein said at least one aircraft flight control system is selected from the group consisting of: a servo, an engine, a rudder, an aileron and an elevator.

21. The system of claim 17, wherein said positioning module comprises an accelerometer that comprises an inclinometer.

22. The system of claim 17, wherein said modified control signals being sent to said flight control system place said aircraft in straight and level flight.

23. The system of claim 17, wherein said modified control signals being sent to said flight control system place said aircraft in a level flight circular pattern.

* * * * *